United States Patent [19]

Forde, III et al.

[11] Patent Number: 5,191,656

[45] Date of Patent: Mar. 2, 1993

[54] METHOD AND APPARATUS FOR SHARED USE OF A MULTIPLEXED ADDRESS/DATA SIGNAL BUS BY MULTIPLE BUS MASTERS

[75] Inventors: Stephen J. Forde, III, West Boylston, Mass.; Harold A. Rosenberg, Ann Arbor, Mich.

[73] Assignee: Digital Equipment Corporation, Maynard, Mass.

[21] Appl. No.: 751,766

[22] Filed: Aug. 29, 1991

[51] Int. Cl.$^5$ .......................................... G06F 13/364
[52] U.S. Cl. ................... 395/325; 395/725; 395/275; 340/825.5; 364/242.6; 364/242.92; 364/240; 364/240.1; 364/240.2; 364/240.5; 364/DIG. 1
[58] Field of Search ... 364/200 MS File, 900 MS File; 395/325, 275, 725, 200, 425; 370/80, 85.2, 85.6; 340/825.5, 825.52

[56] References Cited

U.S. PATENT DOCUMENTS

| | | | |
|---|---|---|---|
| 4,237,534 | 12/1980 | Felix | 364/200 |
| 4,608,631 | 8/1986 | Stiffler et al. | 395/325 |
| 4,794,516 | 12/1988 | Auerbach et al. | 364/200 |
| 4,972,313 | 11/1990 | Getson, Jr. et al. | 364/200 |
| 4,980,854 | 12/1990 | Donaldson et al. | 364/900 |
| 5,038,276 | 8/1991 | Bozzetti et al. | 364/200 |
| 5,081,576 | 1/1992 | Ward | 395/325 |
| 5,083,260 | 1/1992 | Tsuchiya | 395/325 |
| 5,097,483 | 3/1992 | Bechtalsheim | 375/17 |

OTHER PUBLICATIONS

"Arbitration and Control Acquisition in the Proposed IEEE 896 Future Bus", IEEE Micro, Aug. 1984, pp. 28-41.

"High-Speed Processor Bus Arbitration", IBM Tech. Disclosure Bulletin, vol. 28, No. 12, May 1986, pp. 5329-5333.

*Primary Examiner*—Michael R. Fleming
*Assistant Examiner*—Gopal C. Ray
*Attorney, Agent, or Firm*—Cesari and McKenna

[57] ABSTRACT

A multiplexed address/data signal bus capable of supporting multiple bus masters includes a group of control signal lines "shared" by each bus requestor device (BRD) coupled to the bus and a group of control signal lines "replicated" into sets, one for each BRD. The bus arrangement includes a central arbitration unit located in a host bus interface (HBI) which controls BRD access to the bus. A selection control signal is provided to select a set of replicated control signals corresponding to a current bus master. Bus isolation units (BIUs) are provided to isolate the BRDs from the shared control signals, thereby allowing multiple BRDs to "simultaneously" utilize the signal bus in order to execute multiple bus transactions in parallel.

7 Claims, 6 Drawing Sheets

METHOD AND APPARATUS FOR SHARED USE OF A MULTIPLEXED ADDRESS/DATA SIGNAL BUS BY MULTIPLE BUS MASTERS

FIELD OF THE INVENTION

This invention relates generally to computer signal buses and, more specifically, to a multiplexed address-/data bus arrangement having multiple bus masters, each of which is capable of controlling the bus in accordance with a central arbitration technique.

BACKGROUND OF THE INVENTION

A computer system typically employs a system bus to exchange information between devices of the system, including a central processing unit (CPU), a host memory and an input/output (I/O) adapter. The exchange of information is typically accomplished via a bus transaction, which consists of an address transfer over the bus followed by a data transfer. A bus transaction may be a "write" transaction or a "read" transaction, depending upon the direction of the data flow with respect to a receiver, e.g., the host memory. For example, a read transaction transfers data from memory to the CPU or I/O adapter, and a write transaction transfers data to the memory. Typically, a bus transaction involves more than one data transfer over the bus.

During a bus transaction, information may be exchanged among the devices of the system according to a "master-slave" arrangement. A bus master is a device that initiates the bus transaction, while a bus slave, i.e., the device addressed by the master, responds to the transaction request. Examples of a bus master may be a CPU or an I/O adapter, whereas a bus slave may be a memory unit or an I/O unit, e.g., a disk drive.

Computer systems having multiple bus masters, each of which may request use of the bus, typically employ a central arbitration system to decide which bus master is granted access to the bus. For example, a bus master is granted access to and control of the system bus in accordance with an ordering procedure defined by the arbitration access policy. Typically, the access policy provides for only one bus master at a time. Consequently, a bus master requesting control of the bus at a time when another device has access must wait until the current bus master relinquishes control before transferring information. This latent period may adversely affect bus utilization and reduce system performance, particularly if the current bus slave requires a significant amount of time to process a request.

One approach to increasing bus utilization is to restructure use of the bus such that a bus master issues a request to a bus slave and then relinquishes total control of the bus. The slave responds to the master at a later time after it has completed the request. Although this approach, called a pended bus arrangement, significantly increases the utilization of the bus, the circuitry needed to implement the pended bus protocols Within the bus devices are costly and complex.

Accordingly, it is among the objects of this invention to provide a simple, low-cost I/O adapter capable of operating on a pended system bus.

Another object of the invention is to provide a simple, low-cost I/O adapter having multiple microprocessor-based devices for controlling multiple I/O units, wherein each device is capable of operating on a pended system bus.

Yet another object of the invention is to provide a multiplexed address/data signal bus for interconnecting multiple microprocessor-based devices, each of which may concurrently function as a bus master on the signal bus.

SUMMARY OF THE INVENTION

Briefly, a bus arrangement in accordance with the invention includes a signal bus having common multiplexed address/data lines and two groups of control lines: a group that is "shared" by each bus requestor device (BRD) coupled to the bus and a group that is "replicated" into sets, one for each BRD. A selection control signal is provided to select the set of replicated control signals associated with the BRD currently controlling the bus. Bus isolation units (BIUs) are also provided to isolate the other BRDs from the shared control signals, thus enabling multiple BRDs to "concurrently" function as bus masters.

Specifically, the BRDs residing on the signal bus are coupled to a host memory connected to a system bus via a host bus interface (HBI). The HBI includes a bus controller that forwards transactions initiated on the signal bus and targeted for the host memory to the system bus. The HBI also includes a central arbitration unit that controls BRD access to the signal bus and enables isolation of current BRD bus masters.

For example, a BRD arbitrates and obtains access to the signal bus. It then initiates a read transaction to acquire data from the host memory. The BRD forwards the transaction request to the system bus via the HBI. While waiting for the host memory to return the requested data, the BRD electrically isolates itself from the address/data lines; yet, as though it still maintains control of the signal bus, the BRD continues to drive its control lines, including the shared control signals.

Meanwhile, the HBI has decoded the transaction as a request that typically takes a relatively long time to complete, e.g., a read request to host memory. Therefore, the HBI electrically isolates the BRD from the shared control lines of the signal bus by activating the BRD's respective BIU. This allows either the HBI or another BRD to acquire control of the signal bus and initiate a subsequent transaction without interrupting the pending read operation.

Once the subsequent transaction completes and the requested data of the pending transaction is ready to be returned, the HBI electrically couples the BRD to the shared control lines and signals the BRD to retrieve the data from the address/data lines.

An advantage of the invention is that an I/O adapter having a single interface to a pended system bus may further include multiple devices capable of "operating", i.e., initiating transactions, on the pended bus. Specifically, the BRD devices do not contain the circuitry needed to implement the pended bus protocols. However, the HBI in conjunction with the BIUs, simulate a "pended" environment for the BRDs coupled to the signal bus. Therefore, multiple BRD devices may initiate "simultaneous" bus transactions across the signal bus and utilize the bus in a parallel, rather than sequential, fashion. As a result, the bus arrangement in accordance with the invention increases the performance of a signal bus connecting devices that share the bus in a master/slave relationship.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
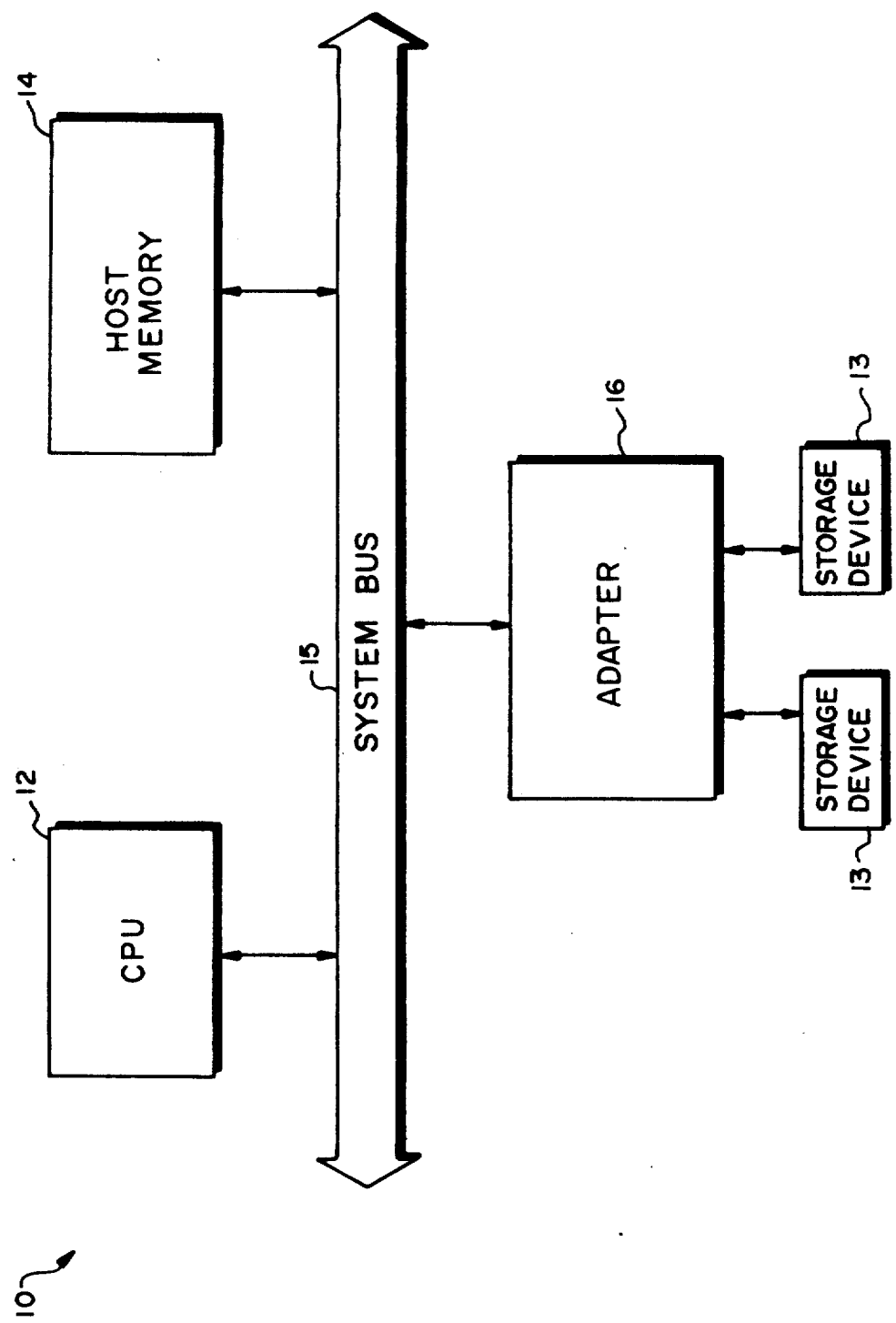
FIG. 1 is a block diagram of a computer system including an input/output (I/O) adapter incorporating a signal bus arrangement in accordance with the invention.

FIG. 1 is a block diagram of portions of a computer system 10, including a central processor unit (CPU) 12, a host memory 14 and an input/output (I/O) adapter 16 interconnected by a system bus 15. The system bus 15 may be a pended bus over which multiple transactions may be simultaneously executed. In general, the I/O adapter 16 receives information from output storage devices 13, such as disk drives, manipulates and formats the information for transmission on the system bus 15, and then transfers the information to the CPU 12 via the host memory 14. Information is similarly processed when transferred from the host memory 14 to the output devices 13. The adapter 16 includes the appropriate hardware and software modules required to free the CPU 12 from such I/O controller tasks.

Figure 2:
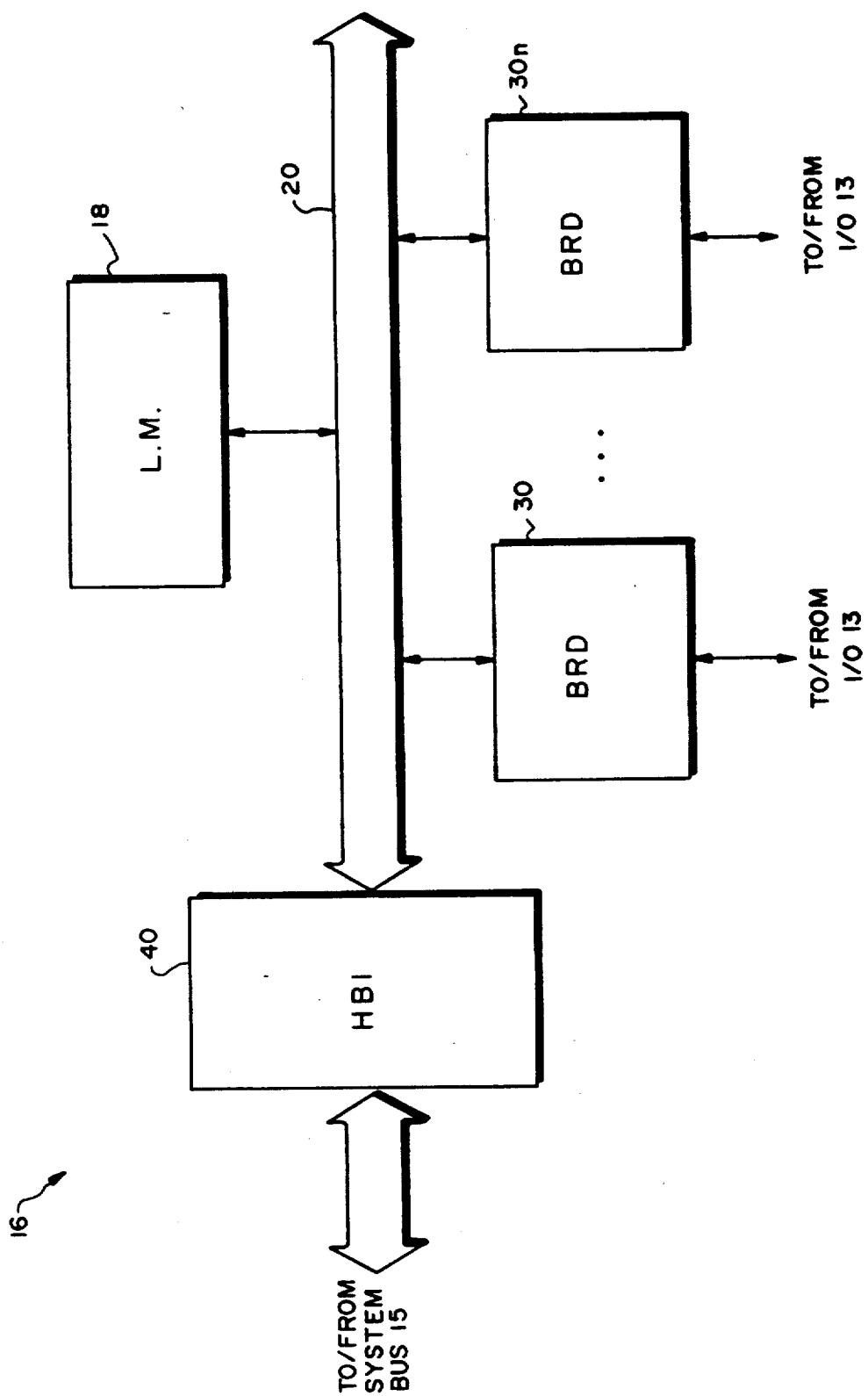
FIG. 2 is a block diagram of the adapter of FIG. 1.

Referring also to FIG. 2, the I/O adapter 16 includes a local memory 18, a host bus interface (HBI) 40 and a plurality of bus requestor devices (BRDs) 30-30n connected to an internal adapter signal bus 20. Each BRD, generally designated 30, includes a microprocessor capable of executing basic arithmetic and boolean instructions needed for controller applications. Each BRD is also capable of arbitrating for and obtaining access to the signal bus 20 to initiate read or write bus transactions. As described further below, the signal bus 20 is a modified version of a typical microprocessor bus; bus transactions are executed over the bus 20 in accordance with a master-slave relationship.

The HBI 40 couples the signal bus 20 to the system bus 15 and, thus, contains the circuitry needed to ensure that the adapter 16 meets the timing and electrical characteristics for receiving and transmitting information to and from the system bus 15. Moreover, the HBI 40 provides translation of addresses received from the BRDs to addresses recognizable by the host memory 14. Since it is both a transmitter and receiver of information to and from the signal bus 20, the HBI 40 includes the logic necessary for it to function as a master or slave device on the bus 20. The HBI also contains the arbitration logic required to issue control of the signal bus 20 to requesting devices. A more detailed description of the HBI 40 is provided below in connection with FIG. 4.

The local memory 18 includes storage locations for temporarily buffering information, including data transferred between the host memory 14 and output devices 13. These storage locations may be accessed by the BRDs 30 or HBI 40. As noted, bus transactions are implemented on the signal bus 20 in a master-slave arrangement. In general, the local memory 18 always responds to data transfer requests from the BRDs 30 and HBI 40, i.e., signal bus "masters"; accordingly, the local memory 18 is a signal bus slave device.

Specifically, data transfer across the bus 20 is accomplished by a "handshaking" exchange between devices. For example, the bus master drives signals on certain bus lines and then drives a strobe signal to request that a slave device execute a particular transaction. The command requests are therefore embedded within the strobe signals. The master-slave relationship among devices connected to the bus typically implies that the master does not relinquish control of the bus until it releases it's bus request line. Accordingly, only one master typically controls the bus throughout the duration of a bus transaction.

In general, the arrangement described herein increases the utilization of the signal bus 20 when a bus transaction requiring a relatively long time, i.e, many signal bus cycles, to complete is pending. For example, after a BRD 30 initiates a read transaction to acquire data residing in host memory 14, a variable amount of time transpires until the HBI 40 obtains the data via the system bus 15. Since the BRD maintains control of the signal bus 20 during the transaction, no other activity occurs on the bus 20 during this time and other devices requiring access to the bus are stalled. The arrangement described herein specifically allows more than one device to "simultaneously" obtain mastership of the signal bus 20 during such a pending read transaction to host memory 14.

Figure 3:
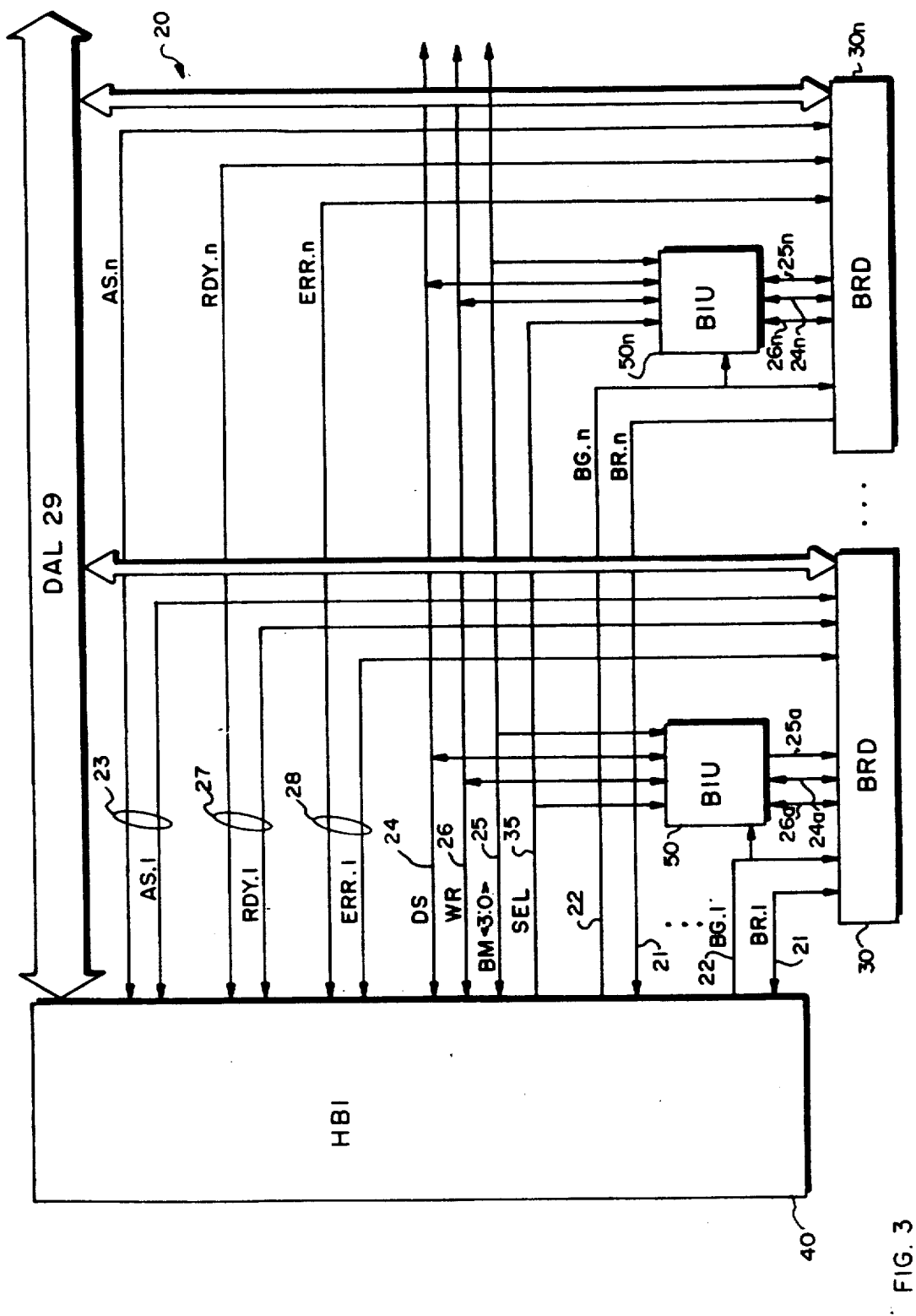
FIG. 3 is a diagram of the signal bus arrangement in accordance with the invention.

In accordance with the invention, the signal bus arrangement includes a signal bus, i.e., CPBUS 20, having multiplexed address/data lines common to all the devices connected to the bus. In addition, the CPBUS 20 has two groups of control lines: a group "shared" among the BRDs 30 and a group "replicated" into sets, one for each BRD. FIG. 3 depicts the CPBUS 20, including the following signal lines:

Bus Request (BRx) 21: signals used by the BRDs to request control of the CPBUS from the bus arbiter;

Bus Grant (BGx) 22: signals used by the bus arbiter to grant control of the CPBUS to a BRD;

Address Strobe (ASx) 23: signals asserted by the bus master when the data/address lines contain valid address information;

Data strobe (DS) 24: signals asserted to provide timing information for the data transfer portion of a bus transaction;

Byte Mask (BM) 25: signals used to specify which bytes of the current data transfer contain valid information during the data phase of the current bus transaction;

Write (WR) 26: signals used to specify the direction of the current data transfer;

Data Ready (RDYx) 27: signals used to synchronize data transfers between a bus master and a bus slave;

Data Error (ERRx) 28: signals used by a bus slave to indicate an error condition to a current bus master; and Data/Address Lines (DAL) 29: multiplexed data/address lines used to transfer all data and address information among the devices of the adapter 16.

The "shared" group of control signals includes the DSx 24, WRx 26 and BM 25 bus lines; the "replicated" group includes the ASx 23, RDYx 27, and ERRx 28 signal lines. As described further below, selection (SEL) control signal lines 35 are provided to select a set of replicated control signals associated with a BRD currently controlling the bus. When activated, the proper SEL 35 line allows a BRD to function as though it is the only bus master residing on the CPBUS 20, thereby providing a data path to both the HBI 40 and to the local memory 18.

Figure 4:
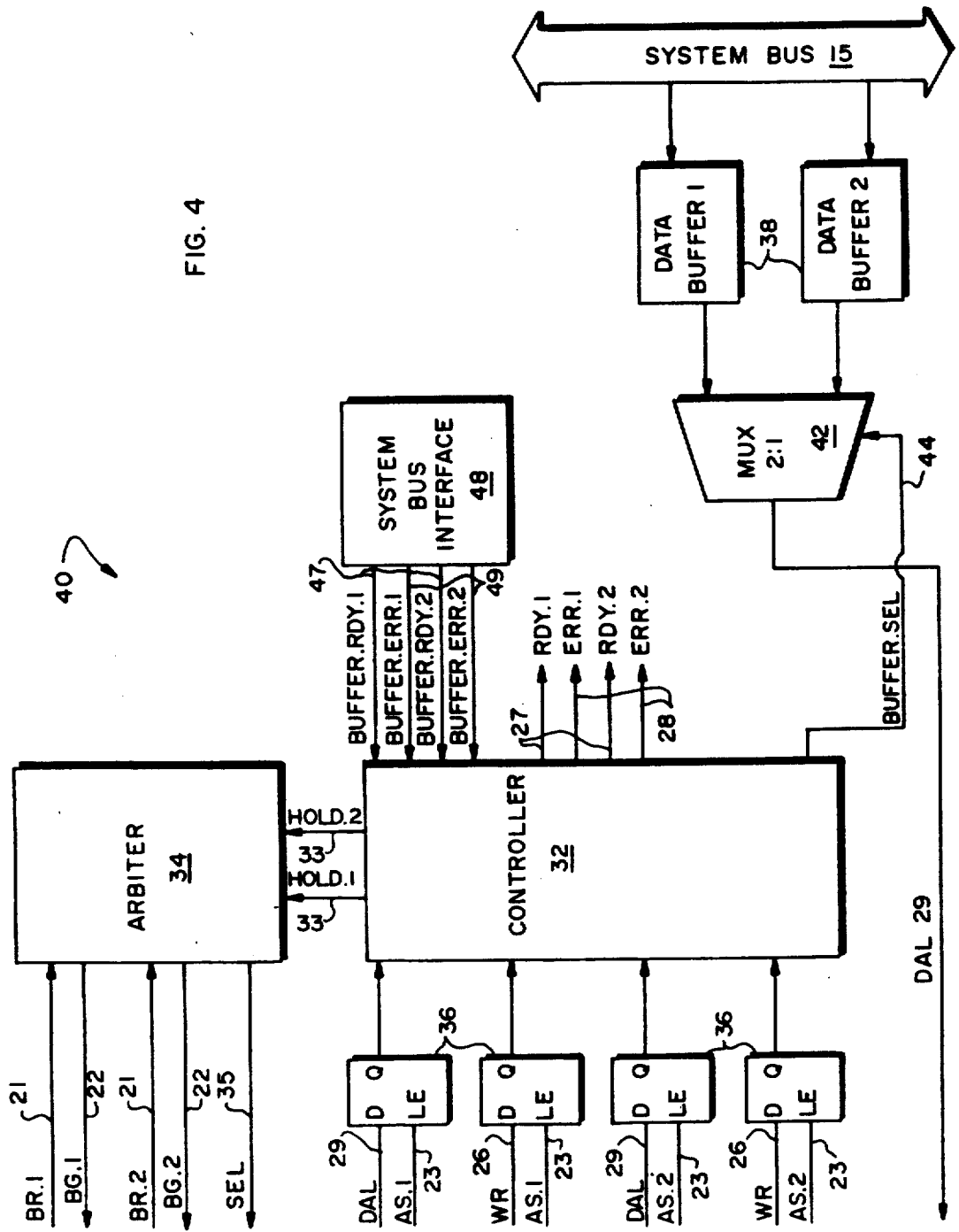
FIG. 4 is a block diagram of a host bus interface in accordance with the invention.

The arrangement in accordance with the invention also includes circuitry within the HBI 40 to enable other devices to control the CPBUS 20 during a pending transaction. FIG. 4 is a block diagram of the HBI. The HBI includes address decode and CPBUS control logic, i.e., the CPBUS "controller" 32, central arbiter logic, i.e., the CPBUS "arbiter" 34, and interface logic to the system bus, i.e., "system bus interface" 48. In general, the controller 32 decodes the address and address strobe signals driven by a BRD 30 on the CPBUS 20 to determine if a transaction request is targeted for the system bus 15. If so and the transaction is a read request, the controller 32 notifies the arbiter 34 via a HOLD.x signal on line 33. The arbiter 34 then executes its arbitration policy to allow a next device to control the CPBUS 20. Later, when the requested data is returned from the system bus 15, the system bus interface 48 notifies the controller 32.

The functions of the controller 32, arbiter 34 and system bus interface 48 are preferably implemented as a state machine within the HBI 40, although it is understood that equivalent logic may be interchangeably used. The transaction decoding and information transfer operations of these functional units are facilitated by various data path logic. For example, address signals transferred on the DAL 29 lines of CPBUS 20 are received at the HBI 30 by latches 36, which may be D-type flip-flops. Specifically, the address and WR signals are coupled to the D inputs of the latches 36, which are enabled by address strobe signals on the AS.x 23 lines, while the Q outputs of the latches are connected to the controller 32.

Data returned to the HBI 30 from the system bus 15 is stored in data buffers 38. The number of data buffers 38 located in HBI 30 is preferably equal to the number of BRDs 40 coupled to the CPBUS 20. As will be described further below, the HBI 30 transfers the data stored in buffer 38 to the appropriate BRD 40 once an intervening (if any) transaction on CPBUS 20 has completed. Specifically, the controller 32 asserts a BUF-FER.SELECT signal on line 44 to enable a multiplexer 42 so that the contents of the proper data buffer 38 are placed onto the DAL (data) 29 lines of the CPBUS. System bus interface logic 48 notifies the controller 32 of the returned data by asserting the appropriate BUF-FER.RDY.X signal on line 47; BUFFER.ERR.X signals on lines 49 inform the controller 32 of any errors occuring during the return of the data to the HBI 40. The controller 32, in turn, notifies the appropriate BRD 30 of data availability and any errors associated with the data by asserting the proper RDY.x 27 and ERR.x 28 signals lines.

Figure 5:
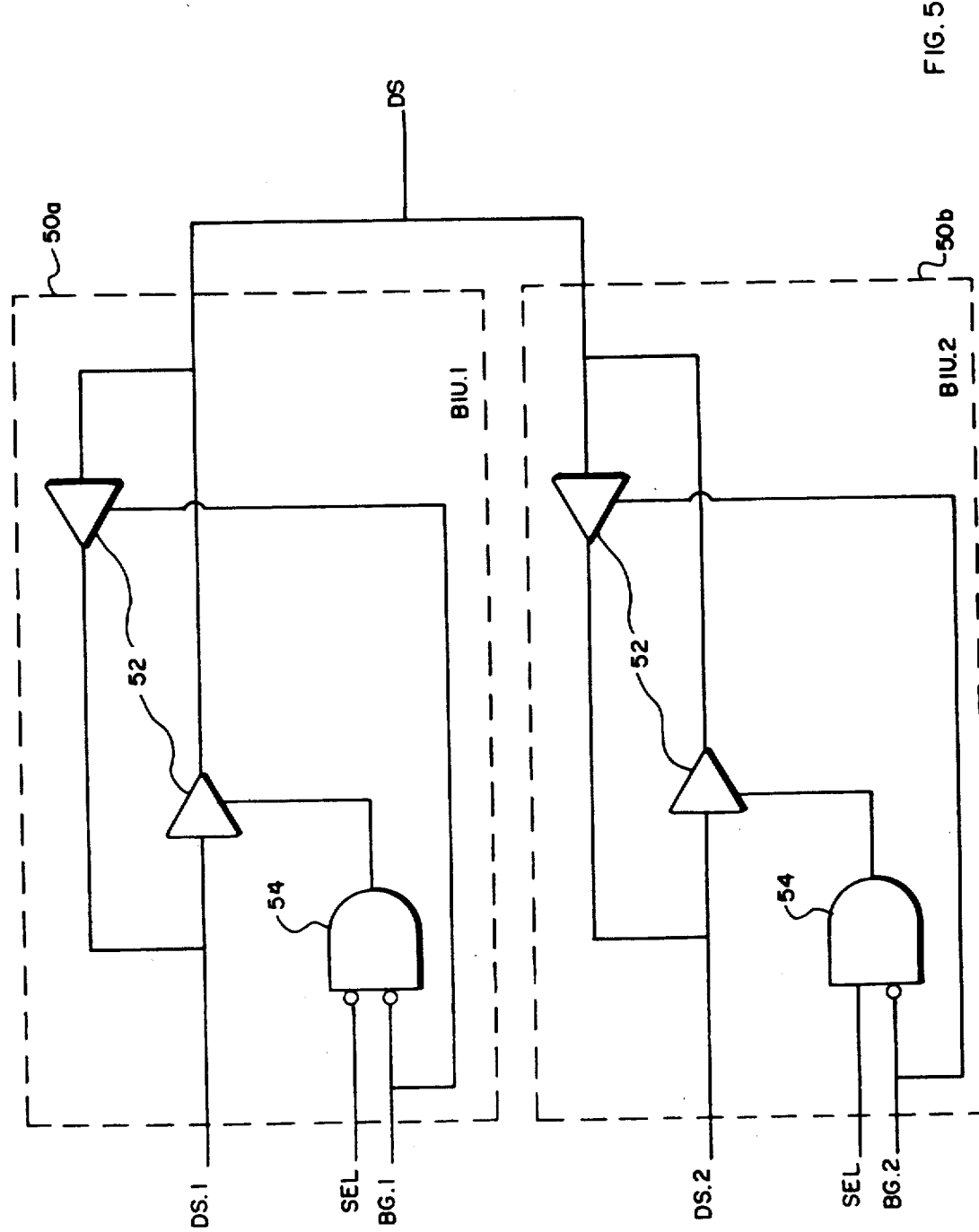
FIG. 5 is a block diagram of a bus isolation unit in accordance with the invention.

Refer again to FIG. 3. Prior to the arbiter 34 granting control of the CPBUS 20 to a next device, the current BRD bus master is isolated from the shared control lines of the CPBUS 20. A bus isolation unit (BIU) 50, associated with each BRD 30, provides a mechanism for isolating the BRD from the shared signals, thus allowing other BRDs to control those signal lines without interfering with the pending transaction. FIG. 5 is a block diagram of two BIUs 50a, 50b, generally designated 50. Logic circuitry isolates the DSx 24a, WRx 26a and BMx 25 control signal inputs to the BIU 50 driven by a "held" BRD from the shared DS 26, WR 24 and BM 25 signals connected to the HBI 40 and other BRDs 30 on the CPBUS 20. For purposes of clarification, circuitry relating to only the DS 26 signal line is depicted, although a similar circuit configuration would apply to the WR 26 and BM 25 signal lines.

The BIU 50 is preferably composed of tri-state drivers and logic gates. Although there are various ways of implementing the BIU, the function is to "isolate" a BRD 30 from the shared control signal lines by presenting a high-impedance state to the shared CPBUS lines. Specifically, an arrangement of two tri-state drivers, generally designated 52, enabled by the output of a two-input AND gate 54 having at least one inverted input, constitutes an illustrative embodiment of a BIU 50. SEL 35 and BGx 22 are the inputs to the gate 54, while a DSx signal is the input to driver 52. Generally, when a BRD 30 drives the shared control signal lines and the BRD is in a "held" state, i.e., the respective BIU 50 is not selected via the SEL 35 signals, then the outputs of the BIU (coupled to the HBI 40) are placed at a high-impedance state. This allows other BRDs 30 or the HBI 40 to drive the shared signals without adversely affecting the operation of the held BRD. It should be noted that use of the shared signals should not be "seen" by the held BRD. In other words, the respective BIU 50 should provide isolation of the DS 26, WR 24 and BM 25 signals in both directions.

The following table sets forth the function of the two BIUs 50, 50n coupled between respective BRDs 30, 30n and the CPBUS 20. It will be understood to those skilled in the art that the encoded signals presented in the table may be used to design logic circuitry to implement the BIU function.

TABLE 1

| SEL | BG.1 | BG.2 | DESCRIPTION OF BIU FUNCTION |
|---|---|---|---|
| 0 | 0 | 0 | Both BRDs are active and have been granted the CPBUS. BRD.1 is currently selected. DS.1 is driven by BRD.1 and is enabled onto DS. DS.2 is driven by BRD.2, but is isolated from DS. |
| 0 | 0 | 1 | BRD.1 is active and has been granted the CPBUS. BRD.1 is currently selected. DS.1 is driven by BRD.1 and is enabled onto DS. DS.2 is enabled to receive whatever is driven onto DS. |
| 0 | 1 | 0 | BRD.2 is active and has been granted the CPBUS. BRD.2 is not selected (it is "held"). DS.2 is driven by BRD.2 but is isolated from DS. DS.1 is enabled to receive whatever is driven onto DS. |
| 0 | 1 | 1 | Neither BRD is active. Both DS.1 and DS.2 are enabled to receive whatever is driven onto DS. |
| 1 | 0 | 0 | Both BRDs are active and have been granted the CPBUS. BRD.2 is currently selected. DS.2 is driven by BRD.2 and is enabled onto DS. DS.1 is driven by BRD.1, but is isolated from DS. |
| 1 | 0 | 1 | BRD.1 is active and has been granted the CPBUS. BRD.1 is not selected (it is "held"). DS.1 is driven by BRD.1, but is isolated from DS. DS.2 is enabled to receive whatever is driven onto DS. |
| 1 | 1 | 0 | BRD.2 is active and has been granted the CPBUS. BRD.2 is currently selected. DS.2 is driven by BRD.2 and is enabled onto DS. |

TABLE 1-continued

| SEL | BG.1 | BG.2 | DESCRIPTION OF BIU FUNCTION |
|---|---|---|---|
| | | | DS.1 is enabled to receive whatever is driven onto DS. |
| 1 | 1 | 1 | Neither BRD is active. Both DS.1 and DS.2 are enabled to receive whatever is driven onto DS. |

As noted and referring again to FIG. 3, only the ASX 23, RDYx 27, and ERRx 28 signals are duplicated; the BRDs share all other CPBUS signals including the DS 24, WR 26 and BM 25 signal lines. These shared signals are "driven" by a BRD 30 while it is being held, i.e., the BRD's transceivers are in the transmit position; however, they are also driven by the HBI 40 and other BRDs. In accordance with the invention, the SEL signal(s) 35 addresses this issue. The arbiter 34 (FIG. 4) drives SEL 35, which controls the BIUs 50 by allowing DS, WR and BM signals to pass through the BIU in particular directions. Specifically, the number N of SEL 35 signals needed for a CPBUS 20 implementation is determined by the number of BRDs that reside on the CPBUS:

$$N = \lceil \log 2 \text{ (number of BRDs)} \rceil$$

Refer now to FIGS. 4 and 5 for a description of the operation of the HBI 40 and BIU 50 during a read transaction to host memory 14 initiated by a bus master (BRD.1) on the CPBUS 20. Prior to initiating the bus transaction, BRD.1 drives it's request signal BG.1 to obtain control of the CPBUS. The arbiter 34 responds to the request by asserting the grant signal BG.1 and by driving SEL 35 to a non-asserted, i.e., "0", position. It should be noted that SEL is preferably in a "0" position by default.

BRD.1 then drives the address of the host memory onto the DAL 29 lines of the CPBUS, and deasserts WR.1, indicating a read transaction. BRD.1 then asserts AS.1; the address and value of WR.1 (now WR) are stored in the latches 36. In contrast, the assertion of WR.1 indicates a write transaction. For a write transaction, WR.1 is asserted immediately after the assertion of AS.1.

BRD.1 indicates it is ready to receive the requested data by asserting DS.1. The assertion of DS.1 is also an indication that BRD.1 is no longer driving the DAL 29 lines and has, in fact, presented a high impedance state to the bus lines via its drivers. Therefore, the DAL 29 lines do not require buffering and another device, i.e., the bus slave, can drive the requested data onto the bus.

The latched address is decoded by the controller 32; upon determination that the transaction is targeted for host memory, the controller asserts the HOLD.1 signal to the arbiter 34. As noted, the invention generally applies when a BRD initiates a read transaction that creates a long time delay from when the master requests the data to when the master receives the data.

The arbiter 34 decodes the assertion of HOLD.1 and, in turn, grants the CPBUS 20 to the next requestor, e.g., BRD.2. The CPBUS 20 is now available to BRD.2. Concurrently, the arbiter switches SEL 35 from a non-asserted "0" to an asserted "1", thereby indicating BRD.1 is "held" (see Table 1). BIU 50 provides a mechanism for enabling another device to control the bus 20 without impacting the pending transaction. The BIU 50 is activated by the SEL 35 line in combination with the BG.1 signal. Specifically, an asserted BG.2 in combination with an asserted SEL 35 enables BIU.2 to pass DS.2, WR.2 and BM.2<3:0> to the DS, WR and BM<3:0> signal lines, respectively, while all other BRDs are isolated from the shared control lines. The SEL 35 and BG 22 signals are generally needed because it is possible that two devices may be granted access to the bus 20 "simultaneously" by the arbiter 34. The SEL 35 indicates which BRD is currently transmitting or receiving data.

If BRD.2 requests data from the host memory 14 while BRD.1 is held, then both BRDs are held until the data for either device is received by the HBI 40 via the system bus 15. In an embodiment of the invention, if both BRDs are held, the arbiter 34 will not grant the CPBUS 20 to another requesting device.

When the host memory returns the requested data, it is stored in a data buffer 38 of the HBI 40 until the CPBUS 20 is available. The system bus interface 48 asserts BUFFER.RDY.1 when the data is received from the system bus 15. If an error arises during execution of the read transaction in host memory 14, the system bus interface 48 instead asserts BUFFER.ERR.1.

Once the controller 32 detects assertion of BUFFER.RDY.1, it deasserts HOLD.1. The controller 32 then generates BUFFER.SELECT to select the appropriate data buffer 38. Meanwhile, the arbiter 34 switches SEL from "1" to "0", thereby enabling DS.1, WR.1 and BM.1<3:0> onto DS, WR and BM<3:0>. Thereafter, the controller 32 drives the data onto the DAL 29 lines of CPBUS 20 and asserts RDY.1. If BUFFER.ERR.1 was asserted, the controller asserts ERR.1.

In general, ERR.1 is asserted if a slave device could not supply the data, or if it decodes the address and determines the transaction request does not reference a valid address. The ERR.1 signal may also be asserted after a bus time-out or when the bus master writes data and the slave decodes a parity error when receiving the data.

The byte mask signals BM<3:0> provide a four-bit byte mask indicating which bytes of the data transfer have valid data. BM<3:0>25 are shared signals which interface to the BIUs 50; if they were not shared, the CPBUS would require at least four additional lines. In general, replication of signal lines not only increases pin count at the HBI 40, it also substantially increases cost if more than two BRDs are connected to the CPBUS 20.

When functioning as a bus master, e.g., the host CPU 12 requests access to registers (not shown) within a BRD, the HBI 40 may use AS.1 to access the registers in BRD.1. Likewise, the HBI may use AS.2 when accessing registers within BRD.2. When the HBI is acting as a bus master to access the local memory 18, it may use any available AS.x 23 signal lines.

Figure 6:
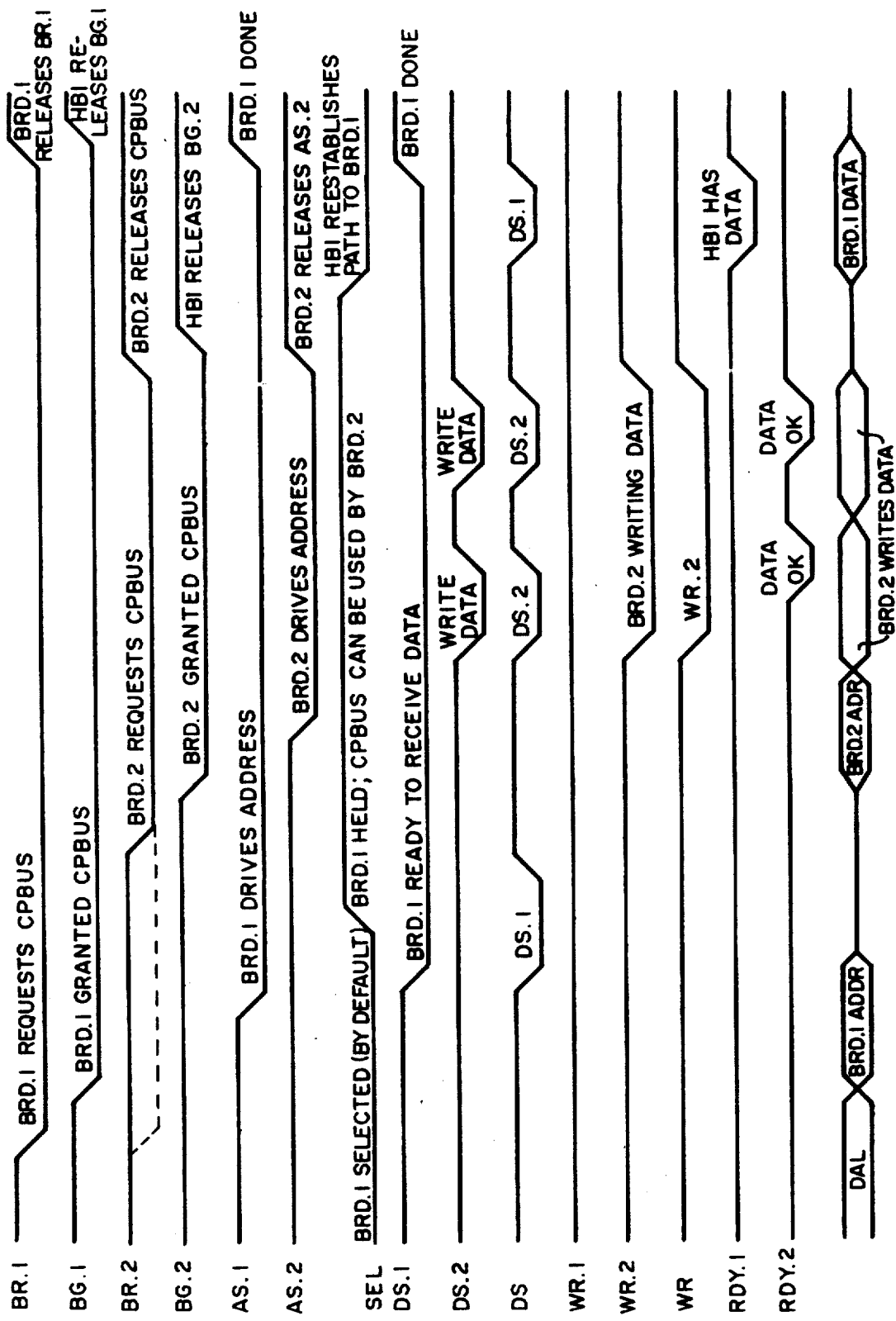
FIG. 6 is a timing diagram showing the handshakes that occur on the signal bus arrangement when more than one bus master has simultaneously initiated a bus transaction.

The timing diagram of FIG. 6 illustrates the handshaking that occurs on the CPBUS when more than one bus master has initiated "simultaneous" bus transactions. In a preferred embodiment of the invention, only one active bus transaction is allowed during a pending read transaction to host memory. However, more than one active transactions are intended within the teachings of the invention.

BRD.1 inititates a read transaction of host memory by asserting BR.1; the bus arbiter 34 responds with BG.1 and BRD.1 obtains the CPBUS 20. It should be noted that BRD.1 continues to drive BR.1 as long as it "controls" the bus 20, while the arbiter 34 drives BG.1 for the duration of the transaction. Next, BRD.1 drives an address on the bus 20 and deasserts WR.1; it then asserts address strobe AS.1. The address information resides on the bus 20 for a specific period of time, e.g., a half of a bus cycle after the assertion of AS.1; yet, AS.1 remains asserted for the duration of the BRD.1 mastership of the CPBUS. The address and the value of WR.1 are decoded by the HBI 40, after compliance with appropriate set-up time requirements. Specifically and according to CPBUS protocol, once the address is placed on the bus 20, BRD.1 drives DS.1 approximately one-half a cycle later.

When DS.1, i.e., the data strobe signal between the BRD.1 and its BIU 50, is asserted, the BIU allows the signal to pass through to DS 24. DS.1 continues to be asserted until BRD.1 has "turned around" it's drivers, thereby presenting a high-impedance state to the DAL 29 lines. Moreover, DS.1 remains asserted until the slave device indicates that the data is ready and on the CPBUS by asserting its ready signal RDY.1.

The arbiter 34 now isolates BRD.1 by asserting SEL 35 and the CPBUS 20 is free. Although BRD.1 believes it still "owns" the bus 20, another bus master may now access the bus. Therefore, BRD.2 asserts BR.2. As depicted by the dotted lines in the diagram, BRD.2 may have asserted BR.2 at the same time as BR.1 or later; yet, in accordance with a preferred arbitration policy, BRD.2 would not have been granted control of the bus until this point.

Meanwhile, SEL 35 is at a high state indicating that the shared signals being used are not BRD.1 signals, but are BRD.2 signals. The assertion of DS.1 presented to the HBI 40 initiates this next sequence. That is, the HBI 40 decoded the transaction as a read request to host memory, and decoded DS.1 as an indication that the BRD.1 has isolated itself from the DAL 29 lines; therefore, it is safe for another device to master the bus. The HBI then drives SEL 35, thus deasserting DS.

The arbiter 34 asserts BG.2 in response to the assertion of BG.2 by BRD.2. Next, BRD.2 places address information on the DAL 29 lines and asserts address strobe AS.2; it then drives data on the DAL lines and asserts DS.2 and WR.2. For purposes of this example, a write transaction to store data in either the local memory 18 or to host memory 14 is the intervening transaction initiated by BRD.2. Write transactions complete relatively fast because the address information is presented to the bus, followed immediately by the data; there is no waiting involved.

If the write data is destined for host memory, the HBI 40 functions as the slave device and generates the RDY.2 signal. RDY is an acknowledge that the slave has received the data without error. Thus, two write data transfer cycles are acknowledged by the assertion of RDY.2 for each of the transfers. BRD.2 then signals the completion of the transaction by deasserting BR.2; it then deasserts AS.2. The arbiter 34, recognizing that the BRD.2 request line has been released, terminates the entire transaction by releasing BG.2.

During the BRD.2 transaction, the HBI 40 may have received the previously requested data from host memory 14, buffered it and now returns it to BRD.1. The HBI indicates that it has the data by returning the SEL 35 signal to the state which activates BRD.1's shared signals. This re-establishes the path to BRD.1, i.e., the BIU no longer isolates BRD.1 from the common DS and WR signal lines. As a result, DS is asserted, while the non-asserted WR.1 signal propagates over the common WR line. RDY.1 is generated by HBI 40, thereby signalling that the data is presented on the CPBUS and ready to be acquired by BRD.1. BRD.1, in turn, signifies it has received the data by deasserting DS.1 (and thus DS). Lastly, the HBI deasserts RDY.1 and BRD.1 relinquishes control of the CPBUS by deasserting BR.1.

The invention described herein provides improved bus efficiency, measured in actual data throughput, and increased system performance, measured by system response time for a device request, as compared to the prior art. By allowing additional devices to access the bus while another bus device has an outstanding request, the utilization of the bus increases.

As an alternative, replication of the entire bus was considered, that is, consideration was given to providing separate buses so that more than one BRD may "simultaneously" execute transactions. However, this approach significantly increases the number of signal pin connections and the cost of bus interface logic, particularly for devices common to the buses.

The foregoing description has been directed to a specific embodiment of this invention. It will be apparent, however, that variations and modifications may be made to the described embodiment, with the attainment of some or all of its advantages. Therefore, it is the object of the appended claims to cover all such variations and modifications as come within the true spirit and scope of the invention.

What is claimed is:

1. Apparatus for exchanging information via transactions between multiple devices of a computer system including a host memory coupled to a system bus, said transactions including a read transaction between said host memory and a corresponding device requesting data from said host memory, said apparatus comprising:

a signal bus for interconnecting said devices and transporting information between said devices, said signal bus having a plurality of multiplexed address/data signal lines shared by said devices and a plurality of control signal lines including (i) a first group of control lines shared by said devices, (ii) a second group of control lines replicated into sets, each set being accessible by one of said devices, and (iii) a selection control signal line for carrying a selection control signal specifying the use of one of said replicated control line sets by said corresponding device initiating said read transaction on said signal bus;

a host bus interface unit for coupling said signal bus to said system bus, said interface unit including (i) a controller connected to said signal bus for decoding the information on said address/data signal lines and (ii) a central arbiter coupled to said controller for activating said selection control signal and for providing access to said signal bus by said corresponding device; and a plurality of bus isolation units, each coupled to an associated one of said devices and capable of isolating said associated device from said shared control lines when activated by said arbiter, wherein said arbiter activates said associated bus isolation unit of said corresponding device while said corresponding device waits for requested data from said host memory such that another of said devices and host bus interface unit may access said signal bus to initiate another of said transactions, thereby enabling simultaneous occurrences of said transactions on said signal bus.

2. Apparatus for initiating transactions to exchange information between a plurality of devices including bus requesting devices, said transactions being initiated subsequent to a pending transaction between a selected bus requesting device and a host memory coupled to a system bus of a computer, said apparatus comprising:

signal bus means for interconnecting said devices, said signal bus means comprising multiplexed bus means for transporting address and data signals between said devices and said host memory, and further including:

shared control bus means for transporting control signals among said devices;

replicated control bus means for transporting control signals among said devices, said replicated control bus means configured into sets, each being accessible by one of said devices; and selection control bus means for specifying use of a selected set of said replicated control bus means by said selected bus requesting device initiating said pending transaction on said signal bus;

bus interface means for coupling said signal bus means to said system bus, said bus interface means including (i) controller means coupled to said signal bus for decoding said address signals to determine if said pending transaction is targeted to said host memory and (ii) arbiter means coupled to said controller means for activating said selection control bus means; and bus isolation means associated with each of said bus requesting devices for isolating said bus requesting devices from said shared control bus means, wherein activation of said bus isolation means associated with said selected bus requesting device isolates said selected device during said pending transaction such that another of said bus requesting devices may access said signal bus means to initiate another transaction, thus enabling simultaneous occurrences of said transactions on said signal bus means.

3. The apparatus of claim 2 wherein said arbiter means further comprises means for providing access to said signal bus means by said another of said bus requesting devices.

4. The apparatus of claim 3 wherein said bus isolation means is activated by said arbiter means.

5. The apparatus of claim 4 wherein said bus interface means is a host bus interface and wherein said arbiter means is a central arbiter.

6. The apparatus of claim 5 wherein said bus isolation means comprises a driver circuit configured to present a high-impedance to said shared control bus means when activated.

7. A method for initiating transactions to exchange information between a plurality of devices including bus requesting device, said transactions being initiated subsequent to a pending transaction between a selected bus requesting device and a host memory coupled to a system bus of a computer, said method comprising the steps of:

interconnecting said devices via a signal bus;

transporting control signals among said devices via shared control signal bus liens and replicated control signal bus lines, said replicated control signal bus lines configured into sets, each accessible by one of said devices;

specifying use of a selected set of said replicated control signal bus lines by said selected bus requesting device initiating said pending transaction on said signal bus using a selection control bus signal;

coupling said signal bus to said system bus with a host bus interface unit;

activating said selection control bus signal with a central arbiter located within said host bus interface unit; and isolating said bus requesting devices from said shared control signal bus liens with a bus isolation unit associated with each of said bus requesting devices, wherein activation of said bus isolation unit associated with said selected bus requesting device isolates said selected device during said pending transaction such that another of said bus requesting devices may access said signal bus to initiate another transaction, thus enabling simultaneous occurrences of said transactions on said signal bus.

* * * * *